US008028892B2

(12) United States Patent
Regensburger et al.

(10) Patent No.: US 8,028,892 B2
(45) Date of Patent: Oct. 4, 2011

(54) SYSTEM CONSISTING OF CONSUMER ITEM, DETECTION DEVICE FOR CODING IN CONSUMER ITEM, AND SERVER, AND PROCESS FOR CARRYING OUT AUTHENTICATION

(75) Inventors: Marcus Regensburger, Molfsee (DE); Torsten Suter, Molfsee (DE); Jochen Claussen, Hohenaspe (DE)

(73) Assignee: Rocks Intertainment GmbH, Hamburg (DE)

( * ) Notice: Subject to any disclaimer, the term of this patent is extended or adjusted under 35 U.S.C. 154(b) by 0 days.

(21) Appl. No.: 12/603,714

(22) Filed: Oct. 22, 2009

(65) Prior Publication Data
US 2010/0102117 A1    Apr. 29, 2010

Related U.S. Application Data

(63) Continuation of application No. PCT/EP2008/008982, filed on Oct. 23, 2008.

(51) Int. Cl.
*G06F 17/00* (2006.01)
(52) U.S. Cl. ............... 235/375; 235/454; 235/462.11; 235/462.42; 235/462.45; 705/14.1; 705/14.46; 705/64
(58) Field of Classification Search ............ 235/375, 235/454, 462.11, 462.42, 462.45; 705/14.1, 705/14.46, 64
See application file for complete search history.

(56) References Cited

U.S. PATENT DOCUMENTS

| 2005/0203854 | A1* | 9/2005 | Das et al. ............... 705/64 |
| 2007/0288267 | A1* | 12/2007 | Fou ........................ 705/2 |
| 2008/0142599 | A1* | 6/2008 | Benillouche et al. .... 235/462.41 |
| 2009/0065579 | A1* | 3/2009 | Grant et al. ............ 235/385 |
| 2010/0077323 | A1* | 3/2010 | Hunter .................. 715/760 |

FOREIGN PATENT DOCUMENTS

| EP | 1 262 896 | 12/2002 |
| EP | 1 587 014 | 10/2005 |
| JP | 2007087126 | * 4/2005 |
| WO | 2006/088579 | 10/2004 |
| WO | 2006/030344 | 3/2006 |
| WO | 2009/012971 | 1/2009 |

OTHER PUBLICATIONS

PCT/EP2008/008982—International Search Report Jun. 1, 2009.

* cited by examiner

*Primary Examiner* — Allyson Trail
(74) *Attorney, Agent, or Firm* — Paul Vincent

(57) ABSTRACT

The system disclosed includes at least a consumer item, such as a cigarette box, medication package or piece of clothing, and a detection device that can be operated by a buyer of the consumer item, which is configured for the detection of a coding in the consumer item, and a server, wherein the coding is hidden in the consumer item, but can be accessed by the buyer of the consumer item, so that the coding can be detected by means of a detection device and be transmitted to the manufacturer via a telecommunications connection to the server, wherein the server verifies if the coding is registered as valid, and wherein, depending upon the verification of the coding, a monetary benefit in favor of the telecommunications number of the buyer is credited by means of the server, and/or the server is configured for transmission of information to the buyer.

20 Claims, 2 Drawing Sheets

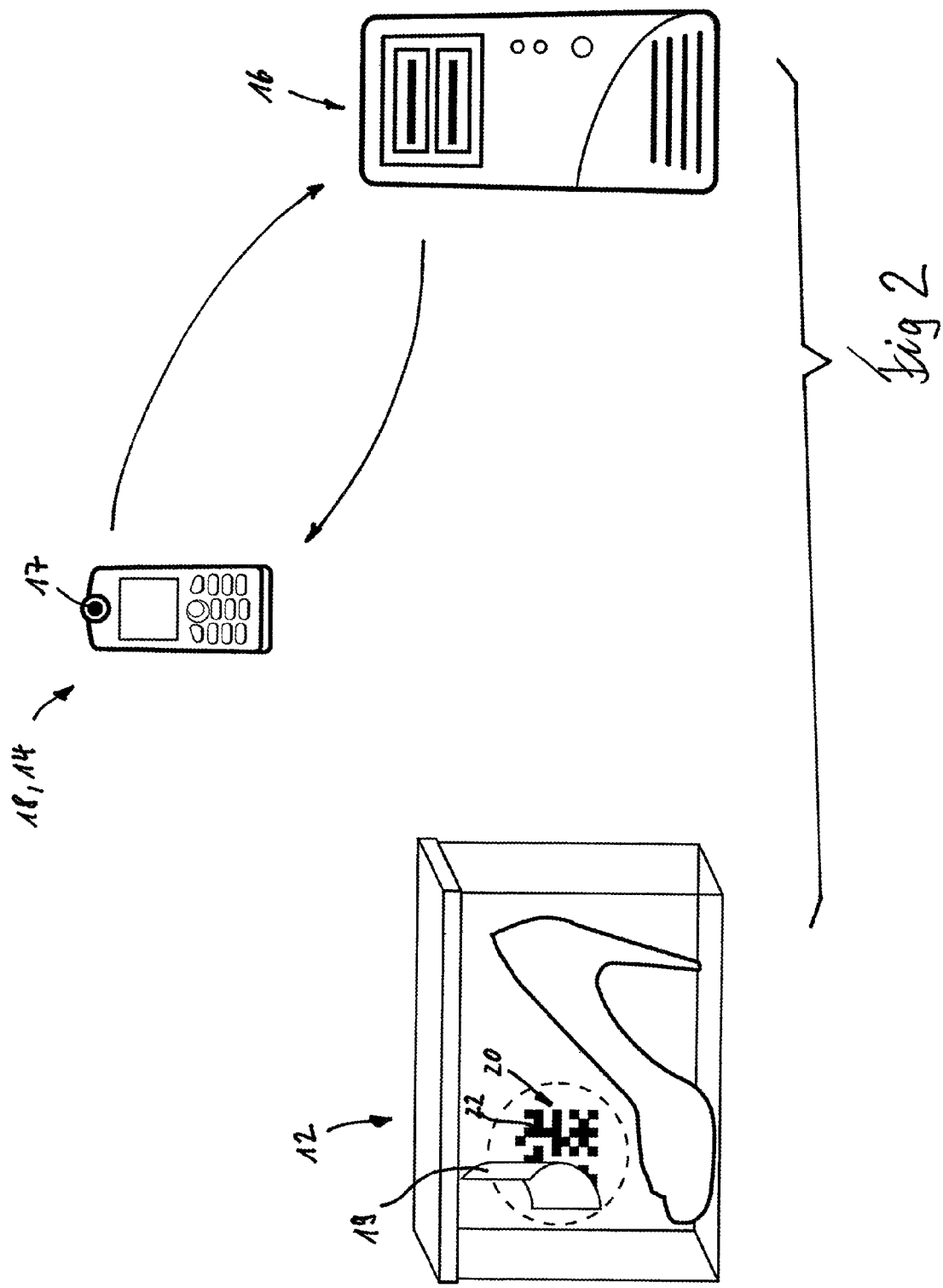

Figure 1:
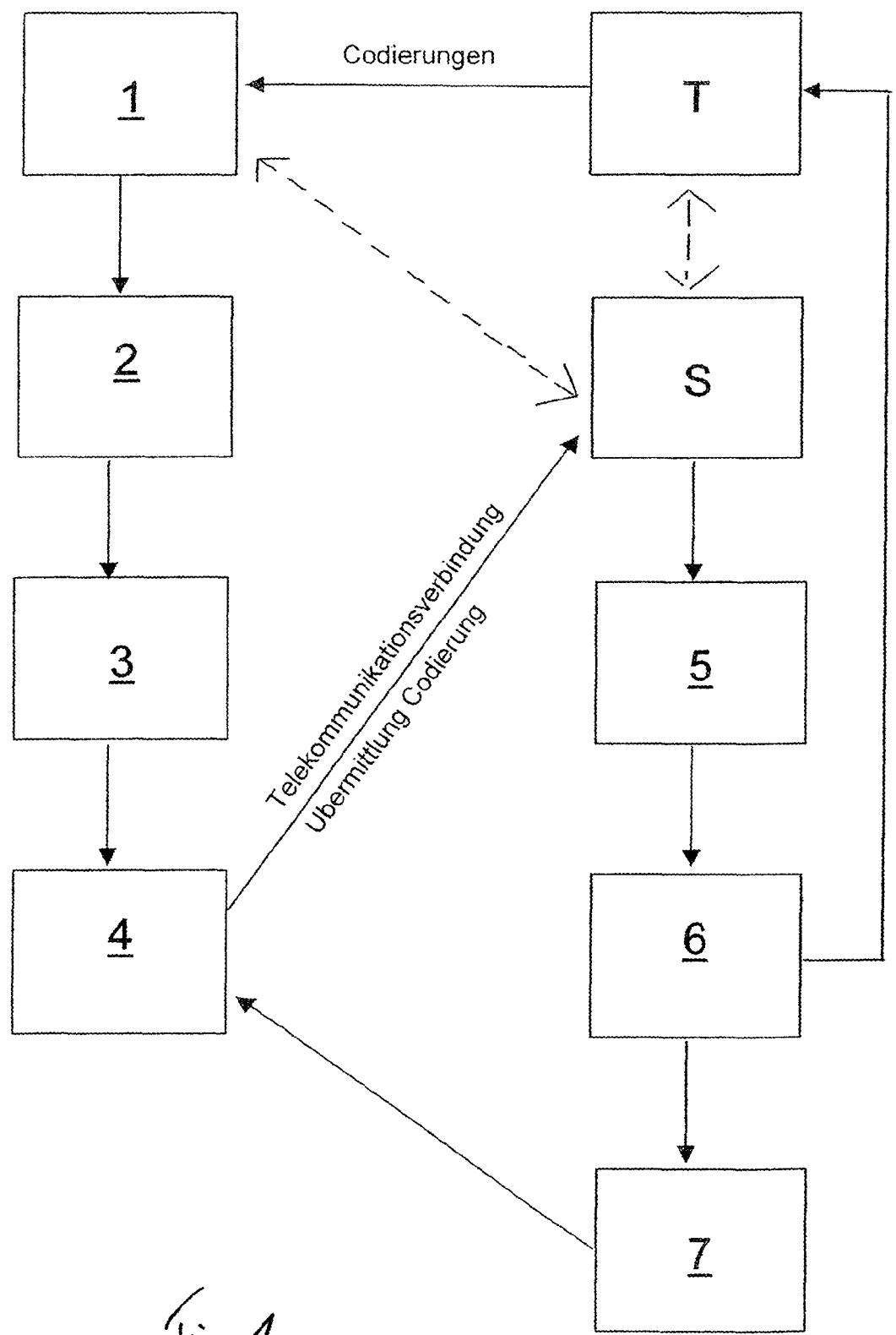

SYSTEM CONSISTING OF CONSUMER ITEM, DETECTION DEVICE FOR CODING IN CONSUMER ITEM, AND SERVER, AND PROCESS FOR CARRYING OUT AUTHENTICATION

CROSS-REFERENCE TO RELATED APPLICATIONS

This application is a continuation of International Application No. PCT/EP2008/008982 filed on Oct. 23, 2008. The disclosures of the above applications are incorporated herein by reference.

FIELD

The disclosure concerns the delivery of a consumer item to the end consumer and in particular the packaging of a consumer item during or for delivery to the end consumer.

BACKGROUND

The statements in this section merely provide background information related to the present disclosure and may not constitute prior art.

Consumer items are sometimes delivered to the end consumer in packaging. The consumer item can be, for example, a cigarette box or medication package or clothing, such as, for example, tennis shoes, with the exception of telephone items, such as prepaid cards. These consumer items are sometimes offered to the end consumer or consumers under a brand name. The end consumer associates special quality notions with the brand name or desires to acquire a consumer item of a specific brand based on other considerations. The manufacturers of brand name items, but also the end consumers, are sometimes exposed to forgeries, that is, corresponding consumer items that are not marketed by the appropriate original company, but as forgeries/pirated products under the pertaining brand name of the legitimate manufacturer. It is sometimes impossible for the end consumer to differentiate an original product from a counterfeit pirated product. Another basic problem may also be that it is very difficult for the manufacturers of consumer goods to design customer retentions systems, since the end consumer is frequently unknown to them.

SUMMARY

We disclose herein a system and device for the end consumer to determine if he has acquired an original product or a forgery. Also disclosed is a system and device to improve the possibilities for customer retention with the acquisition of consumer items utilizing technical means.

Customer retention is attained according to the disclosure by means of a system including but not limited to a consumer item, for example a cigarette box or medication package or piece of clothing, and a detection device that can be operated by a buyer or a user of the consumer item, which is configured for detection of a coding on the consumer item, and a server, wherein the coding is hidden in the consumer item but can be accessed by the buyer of the consumer item, so that the coding can be detected by means of a detection device and can be transmitted to the manufacturer via a telecommunications connection to the server, wherein the server is provided for verifying if the coding is registered as valid, and wherein a monetary benefit in favor of the telecommunications number of the buyer is credited by means of the server in dependence upon this verification and/or the server is configured for transmission of information to the buyer, which is dependent upon the verification of the coding.

In the above discussion of a coding, said coding may be any desired identification or information that individualizes each specific consumer item and is provided for this purpose on the consumer item or its packaging. This coding is, for example, a sequence of ciphers formed in particular by a number and/or letter sequence. A coding such as this is easy to detect and also transmit without much ado to a server via a telecommunications connection.

The telecommunications connection may be a connection that can be established via a mobile phone, such as to an SMS abbreviated dialing prefix, or a connection that can be established via the internet. An SMS connection or the transmittal of the coding per SMS is discussed herein but other coding transmission may be used (independently thereof, the person that establishes the telecommunications connection to the server is identified in the following as the "caller," "buyer or user of the consumer item").

It is also proposed according to the disclosure to provide the pertaining consumer item with a coding on the side of the manufacturer, wherein the coding is provided "hidden" on the consumer item, so that it can only be ascertained by the legitimate buyer or user of the consumer item, that is, that it cannot be ascertained without destroying the packaging of the consumer item or a lamination or covering of the coding provided on the consumer item. The term "consumer item" comprises also its packaging. After the legitimate buyer or user or the end consumer has acquired the consumer item, he can gain access to the hidden coding in order to then mechanically detect the coding utilizing the detection device.

The mechanically detected coding is then transmitted to the mentioned server via a telecommunications connection. This telecommunications connection can be established either by the buyer or user himself or it is automatically produced directly by the detection device after the coding has been detected, which will be discussed further below.

The server verifies then if the coding transmitted to it is registered as valid. If this is the case, in a variation, the buyer/user is granted a monetary benefit, which is credited by the server to his telecommunications number, which constitutes the starting point of the telecommunications connection. The caller receives in this way also the information that the consumer item that he has acquired is an original product of the legitimate manufacturer. The commitment of the end consumer to the consumer item or the brand name of the corresponding manufacturer is also increased through the credit note of a monetary benefit.

According to another variation, the buyer/user receives information from the server, which is dependent upon the verification of the coding. This information is transmitted to the telecommunications number of the buyer/user, which constitutes the starting point of the telecommunications connection. If it should be determined during the course of the verification by the server that the transmitted coding is not registered as valid or, for example, that it has already been transmitted once or several times, this fact is notified. The buyer/user receives therewith the information that he has most likely not acquired an original product, but that it is possible that he has been deceived with regard to the origin of the consumer item that he has acquired. A credit note with monetary benefit is then not granted in this case. Should the verification by means of the server show, however, that the transmitted coding is registered as valid, this is notified to the buyer/user at his telecommunications number. A credit note of monetary benefit can additionally take place in this case.

The buyer/user can thus carry out or initiate on his own an authentication of the product that he has acquired.

It has shown to be particularly advantageous in a further development of the system to configure the detection device for detecting the coding at the same time as for producing a telecommunications connection, comprising for example a mobile phone/PDA or a web-enabled computer, or with a device for producing a telecommunications connection, in order to transmit the detected coding to this device, which then produces in turn the telecommunications connection and transmits to the server the coding received from the detection device.

As already mentioned, the coding may be, for example, a series of ciphers, such as a number and/or letter sequence. In a further development, it can also be shown to be advantageous in turn to provide the coding on the consumer item in encrypted form, such as in the form of a two-dimensional matrix code, for example a quick response code. Such matrix codes are known and regulated, for example, according to ISO/IEC 18004, ISO/IEC 24720, but also in DIN standards and DIN-EN standards. Insofar as the coding is provided in encrypted form, it can also be advantageous to configure the detection device at the same time for decrypting the coding, so that the decrypted coding can again be available already on the detection device, which can then be transmitted to the server via the telecommunications connection. It would also be conceivable to carry out this decryption primarily in or by means of the server. In such a case, the encrypted coding would be transmitted in encrypted form to the server via the telecommunications connection, which is in turn configured for decryption of the coding.

The detection device could be basically conceived in any desired way for detection of the coding. It would thus be conceivable to use audio engineering transponder technology or to magnetically detect the coding. The detection of holographic data would also be conceivable. The detection device may be configured for optical detection of the coding. It can comprise, for example, an image detection device (camera), such as a mobile phone, or for example, the mobile telephone can constitute the detection device.

The mentioned coding could be provided invisible to the outside within a packaging of the consumer item. In such a case, the coding may only be detected by opening the packaging of the consumer item. It would also be conceivable and advantageous to overlay the coding with a covering that cannot be removed without it being destroyed according to a further variation of the principles disclosed. In such a case, the coding could only be determined by detaching, for example scratching off a correspondingly configured covering. Should the coding been seen by an unauthorized third party, this can be seen in any case.

The pertaining telecommunications number, which is dedicated to the server, can likewise be indicated on the consumer item. Different communications numbers in for example for different countries can be disclosed, and namely for the pertaining country in which the consumer item was acquired or from which the telecommunications connection was established.

When the telecommunications number of the server is likewise disclosed on the consumer item, it is shown to be additionally advantageous to configure the detection device also for machine detection of the telecommunications number of the server. Insofar as the detection device is itself also configured for producing a telecommunications connection, the manual input of the telecommunications number of the server may be unnecessary.

It may also be advantageous to configure the detection device for simultaneous detection of the coding and the telecommunications number of the servers.

According to a variation of the disclosure, the telecommunications number of the server is provided in encrypted form, for example together with the coding, in the consumer item, for example in the form of a two-dimensional matrix code, such as a quick response code.

The coding and perhaps also the telecommunications number of the server may be arranged on one and may be the same information carrier. The information carrier is transferred on the side of the manufacturer onto the consumer item or its packaging. A transferable, flat information carrier is also disclosed, on which the coding as well as also the telecommunications number of the server for the detection by means of the detection device are provided. This information carrier is connected to the consumer item or its packaging, for instance glued or hot sealed. It is sufficient if only the coding, but not the telecommunications number of the server is hidden.

It is further advantageous to configure the server for the storage of the posting of the monetary benefit together with the coding. A multiple credit note, which could be caused by a repeated transmittal of the same coding, may be prevented in this way.

In a further variation, it may be advantageous to additionally configure the server for the storage of the telecommunications number. This offers the possibility of individualizing the legitimate user with regard to the further development of customer commitment systems within the scope of the legal regulations.

If the coding is determined to be validly registered during the course of the verification by the server, this information could be transmitted by means of the same and still existing telecommunications connection to the user. It would likewise be indeed conceivable, however, to establish a further telecommunications connection subsequently to the first mentioned telecommunications connection and to transmit the information to the user, for example, in the form of an SMS message. The user can be notified with this information that he has acquired an original product and/or that a monetary benefit has been credited in favor of his telecommunications number. Should the verification yield that the coding is not registered as valid because it was already transmitted previously or because the pertaining coding had not been registered as valid at all, then it is most likely a forgery. A monetary benefit is not credited in this case, and it may advantageous to notify the caller thereof in a suitable way, such as via a telecommunications connection.

One variation of the disclosed process may have the basic features of: acquiring a consumer item, determining a hidden coding on the consumer item utilizing a detection device that can be operated by the buyer or user of the consumer item, establishing a telecommunications connection between a buyer or user of the consumer item and a server and transmitting the coding to the server, verifying by means of the server if the coding is registered as valid, posting a monetary benefit in favor of the telecommunications number of the buyer or user, and/or transmitting information via a telecommunications connection to the buyer or user, which is dependent upon the verification of the coding. The process may be varied by one or more of the following process measures: using the detection device to establish the telecommunications connection; optically detecting the coding using the detection device; using the detection device to perform decryption subsequent to the detection of a coding available in encrypted form, such as in the form of a two-dimensional matrix code;

transmitting the coding in encrypted form to the server, and carrying out the decryption primarily by means of the server; accessing the hidden coding by opening the consumer item or its packaging or by removing a cover such as a lamination that covers the coding; providing a monetary benefit in the form of a telecommunications credit balance; storing on a server the posting of a monetary benefit together with the coding; storing on a server the telecommunications number of the buyer or user.

To use the disclosed system including, for example, a consumer item, a detection device and a server, a manufacturer of a specific consumer item, for example, can approach a telecommunications network provider and acquire from him a number of specific codes, which he will then utilize to individualize his consumer item. If a telecommunications customer of this telecommunications network provider acquires a consumer item provided with a coding as end consumer, he can attain the beneficial use of the credit note of the monetary benefit and/or the verification of the originality of the product by detecting the coding by means of the detection device and establishing a telecommunications connection with his telecommunications network provider. It would also be conceivable for the manufacturer of a consumer item or an optional service provider commissioned with the implementation of the process disclosed to himself operate a telecommunications network or to merely manage the mentioned server. In this case, the concrete coding is not acquired ahead of time by a telecommunications network provider, but it can also be issued and managed by the manufacturer of the consumer item or the mentioned service provider. When an end consumer establishes a telecommunications connection to the pertaining server that is operated and managed by the manufacturer, it would be conceivable to determine the telecommunications network provider of the caller on the basis of this server. The credit note or posting of a monetary benefit in favor of the telecommunications number of the caller can be initiated based on the server or by means of the server. It would also be conceivable, however, to credit and manage the credit benefit in favor of the buyer of the consumer item in another way.

One or more telecommunications connections may be established by the end consumer as buyer of the consumer item, and the coding on the consumer item, which was previously mechanically detected utilizing the detection device, may be transmitted to the server by means of this telecommunications connection. As mentioned, the establishment of this telecommunications connection can also be carried out automatically by means of the detection device after the coding has been detected. The buyer can then attain the beneficial use of an originality verification and/or a monetary benefit. He obtains in this way the assurance of having acquired an original product.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1: shows a flow diagram of a system or process according to the principles of the disclosure; and FIG. 2: shows a schematic representation of a system according to the principles of the disclosure with a consumer item, detection device, and server.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Consumer goods are provided with hidden coding (step 1) during the course of the manufacture or packaging of these consumer goods or in a subsequent step, but always still within the sphere of influence of the manufacturer of consumer goods or a service provider commissioned by him. The coding was obtained either ahead of time by the manufacturer from a telecommunications network provider T, or it was provided by the manufacturer himself. The consumer goods provided in this way with the hidden coding are delivered to the end consumer as buyer and legitimate user of the consumer item in a step 2.

The buyer procures now access to the coding on the consumer item and operates the detection device, which is configured and provided for mechanical detection, in particular for optical detection of the coding on the consumer item (step 3). The detection device is, for example, a mobile phone, which is configured with an image detection device, so that the user can photographically and therefore mechanically record the coding by means of the mobile phone utilizing this mobile phone as detection device. A cumbersome and time-intensive input of the coding consisting in particular of a number/letter sequence is not necessary in this way, but the coding is mechanically detected utilizing the detection device.

In a further step 4, a telecommunications connection to a server S is established, and the coding that was previously mechanically detected by means of the detection device is transmitted to the server S via this telecommunications connection.

The telecommunications number of the server S is likewise disclosed in an advantageous manner on the consumer item, in particular multiple times depending on the country of the caller.

It has shown to be advantageous herein to mechanically detect the telecommunications number in an advantageous manner together with the coding by means of the detection device. When the detection device is configured for the establishment of a telecommunications connection, as explained above, it is thus, for example, a mobile phone, so that it is conceivable and advantageous to initiate the telecommunications connection to the server and transmit the coding to the server, whether automatically or by the user, after mechanically detecting the coding.

The telecommunications number is advantageously an SMS number, so that the coding can be transmitted as SMS to the server.

In step 5 it is checked by means of the server S if the coding is registered as valid. In dependence upon this, a monetary benefit (for example, a specific credit balance amount) is credited by means of the server S in favor of the telecommunications number of the caller/buyer of the consumer item in the subsequent step 6, insofar as the coding is determined to be validly registered. This credit balance of a monetary benefit can be initiated in any desired way by the telecommunications network provider T based on the server S. Attention was already called to the fact that the server S can be directly dedicated to or operated by the telecommunications network provider T (indicated by means of the discontinuous arrow between S and T). It could likewise be conceivable for the server S to be dedicated or operated by the manufacturer of the consumer item (likewise indicated by means of the discontinuous arrow between S and 1).

It could also be conceivable to transmit information to the caller, which notifies him of the result of the verification (step 7) subsequent to the above described verification by means of the server S, in addition to the credit note of a monetary benefit or instead of the credit note of a monetary benefit via the telecommunications connection, in particular via the same still existing telecommunications connection, in particular by means of an SMS. The caller can be notified in this way about the fact that a monetary benefit in favor of his telecommunications number was credited and that he has acquired an original product or he can be notified that the verification has shown that the coding was not registered as valid, which then indicates a forgery.

FIG. 2 shows a schematic representation of a system according to the disclosure showing the consumer item 12, detection device 14, and server 16.

The detection device 14 may be a mobile phone 18 configured with an image detection device 17 in the case represented as an example. A coding 20 in the form of a two-dimensional matrix code 22 covered by means of a removable foil covering 19, which can be optically detected utilizing the mobile phone 18 as detection device 14, is provided again as an example on the consumer item 12, and namely in particular on an inner side of the packaging. The coding 20 is itself likewise provided in encrypted form on the consumer item 12, herein for example as two-dimensional matrix code 22. The mobile phone 18 or the detection device 14 is configured in such a way with regard to its software that it is capable of decrypting the two-dimensional matrix code 22. Therein is then determined the decrypted coding 20 on the one hand, and the telecommunications number of the server 16 is determined on the other hand. The mobile phone 18 or the detection device 14 is further configured in such a way that a telecommunications connection to the server 16 is either initiated by the user or automatically established utilizing the telecommunications number of the server 16 and a coding is transmitted in this way to the server 16. The server performs then the above described verification. An information is transmitted to the user subsequent to this verification, and for example to his telecommunications number, that is, in the present case to the telecommunications number of the mobile phone 18. This can be carried out by means of an SMS. In addition, the credit note of a monetary benefit in favor of the telecommunications number of the mobile phone 18 is initiated, as likewise described above.

It should be noted that the disclosure is not limited to the variations described and illustrated as examples. A large variety of modifications have been described and more are within the scope of the present disclosure. These and further modifications as well as any replacement by technical equivalents may be added to the description and figures, without leaving the scope of the protection of the disclosure and of the present patent.

What is claimed is:

1. A method for verifying the authenticity of a consumer item, the method comprising the steps of:
   a) generating a plurality of unique codings;
   b) storing the plurality of unique codings generated in step a) using a server;
   c) assigning each unique coding to one separate information carrier, each information carrier structured for attachment to one consumer item or to a package containing the consumer item, wherein the unique coding is hidden by a lamination covering the coding;
   d) transferring the information carriers to a manufacturer or distributor of the consumer item for attachment of one unique coding to each consumer item;
   e) receiving a telecommunication message from a consumer, the consumer having acquired the consumer item, exposed the hidden coding located on the consumer item by destroying the lamination covering the coding and automatically detected the exposed coding using a detection device, wherein the message is transmitted by the detection device and contains the unique coding associated with the information carrier attached to the acquired consumer item as well as a telecommunication number of the detection device sending the message;
   f) storing, using the server, the unique coding and the telecommunication number of the detection device;
   g) comparing the coding received in step e) with the plurality of unique codings stored in step b); and
   h) informing the detection device of the consumer that the acquired consumer item is or is not authentic.

2. The method of claim 1, characterized in that the coding is optically detected utilizing the detection device.

3. The method of claim 1, characterized in that a decryption is carried out utilizing the detection device subsequent to the detection of a coding available in at least one of an encrypted form, and a two-dimensional matrix code, by means of the detection device.

4. The method of claim 1, characterized in that the coding is transmitted in encrypted form to the server, and the decryption is carried out primarily by means of the server.

5. The method of claim 1, characterized in that a monetary benefit is transferred to the consumer if the acquired consumer item is authentic.

6. The method of claim 5, characterized in that the server stores the posting of the monetary benefit together with the coding.

7. A system for verifying the authenticity of a consumer item, the system comprising:
   means for generating a plurality of unique codings;
   means for storing the plurality of unique codings using a server;
   means for assigning each unique coding to one separate information carrier, each information carrier structured for attachment to one consumer item or to a package containing the consumer item, wherein the unique coding is hidden by a lamination covering the coding;
   means for transferring the information carriers to a manufacturer or distributor of the consumer item for attachment of one unique coding to each consumer item;
   means for receiving a telecommunication message from a consumer, the consumer having acquired the consumer item, exposed the hidden coding located on the consumer item by destroying the lamination covering the coding and automatically detected the exposed coding using a detection device, wherein the message is transmitted by the detection device and contains the unique coding associated with the information carrier attached to the acquired consumer item as well as a telecommunication number of the detection device sending the message;
   means for storing, using the server, the unique coding and the telecommunication number of the detection device;

means for comparing the received coding with the plurality of unique codings stored by the server; and means for informing the detection device of the consumer that the acquired consumer item is or is not authentic.

8. The system of claim 7, wherein the consumer item is at least one of a cigarette box, a medication package, and a piece of clothing.

9. The system of claim 7, characterized in that the detection device is configured for establishing a telecommunications connection, the telecommunications connection comprising at least one of a mobile phone, a personal digital assistant, a web-enabled computer, and a device for establishing a telecommunications connection in order to transmit the detected coding to this device.

10. The system of claim 7, characterized in that the coding is formed by a cipher sequence, the cipher sequence being a sequence of at least one of numbers and letters.

11. The system of claim 7, characterized in that the coding is provided in at least one of an encrypted form on the consumer item, a two-dimensional matrix code, and a quick response code.

12. The system of claim 7, characterized in that the detection device is configured for decryption of the coding.

13. The system of claim 7, characterized in that the server is configured for decryption of the coding.

14. The system of claim 7, characterized in that the detection device is configured for optical detection of the coding.

15. The system of claim 7, characterized in that a telecommunications number of the server is likewise disclosed on the consumer item.

16. The system of claim 15, characterized in that the detection device is also configured for detection of the telecommunications number of the server.

17. The system of claim 16, characterized in that the detection device is configured for simultaneous detection of the coding and the telecommunications number of the server.

18. The system of claim 15, characterized in that the telecommunications number of the server, in particular together with the coding, is provided in at least one of an encrypted form on the consumer item, a two-dimensional matrix code, and a quick response code.

19. The system of claim 15, characterized in that the telecommunications number of the server are provided on the information carrier.

20. The system of claim 7, characterized in that the server is configured for storage of a posting of a monetary benefit together with the coding.

* * * * *